United States Patent [19]

Yamana

[11] 4,197,762
[45] Apr. 15, 1980

[54] REMOTE CONTROL REAR-VIEW MIRROR

[75] Inventor: Toru Yamana, Fujieda, Japan

[73] Assignee: Murakami Kaimeido Co., Ltd., Japan

[21] Appl. No.: 893,413

[22] Filed: Apr. 4, 1978

[30] Foreign Application Priority Data

Apr. 4, 1977 [JP] Japan ............................ 52-42372[U]
Jun. 29, 1977 [JP] Japan ............................ 52-86846[U]
Aug. 8, 1977 [JP] Japan ............................ 52-106489[U]

[51] Int. Cl.$^2$ .............................................. F16C 1/10
[52] U.S. Cl. ................................ 74/501 M; 248/479;
350/288; 403/321; 403/348
[58] Field of Search ............. 74/501 M; 248/476, 479,
248/222.3; 350/288; 403/321, 322, 348, 343

[56] References Cited

U.S. PATENT DOCUMENTS

| | | | |
|---|---|---|---|
| 1,415,053 | 5/1922 | Robertson | 403/348 |
| 3,096,664 | 7/1963 | Walsh | 74/501 |
| 3,247,722 | 4/1966 | Jacobson | 74/501 M |
| 3,407,683 | 10/1968 | Liedel | 74/501 M |
| 3,442,151 | 5/1969 | Brawner et al. | 74/501 M |
| 3,468,186 | 9/1969 | McIntyre et al. | 74/501 M |
| 3,552,229 | 1/1971 | Cummins et al. | 74/501 |
| 3,800,619 | 4/1974 | McIntyre | 74/501 M |
| 3,818,780 | 6/1974 | McIntyre et al. | 74/501 M |

*Primary Examiner*—Kenneth Dorner
*Attorney, Agent, or Firm*—Hill, Van Santen, Steadman, Chiara & Simpson

[57] ABSTRACT

A remote control rear-view mirror assembly has a bracket mountable on an automotive vehicle and a housing supported on the bracket, in which housing a mirror holder is mounted for universal swiveling movement. The bracket has a shaft extending through a housing bottom plate into the housing and having a plurality of radial cam projections angularly spaced from each other. A fastening means in the housing, having a ring disposed around the shaft has a plurality of cam projections angularly spaced from each other and extending radially inwardly from the annular ring. The cam projections engage each other with the housing bottom plate fastened tightly between the fastening means and the bracket. A cable attachment adapter mounted on the mirror holder has three radial grooves angularly spaced 120 degrees apart from each other. Three control wire elements have ferrules on one end each retained in one of the grooves, the ferrules being prevented from moving out of position by an annular flange on the mirror holder. The mirror holder has a peripheral rim resiliently urged against the peripheral edge of a mirror carried by the mirror holder, the peripheral rim including a flange disposed around and over the peripheral mirror edge. A plurality of resilient arms integral with the mirror holder have projections urged against the mirror to enable the peripheral mirror edge to be held against the peripheral rim flange.

15 Claims, 9 Drawing Figures

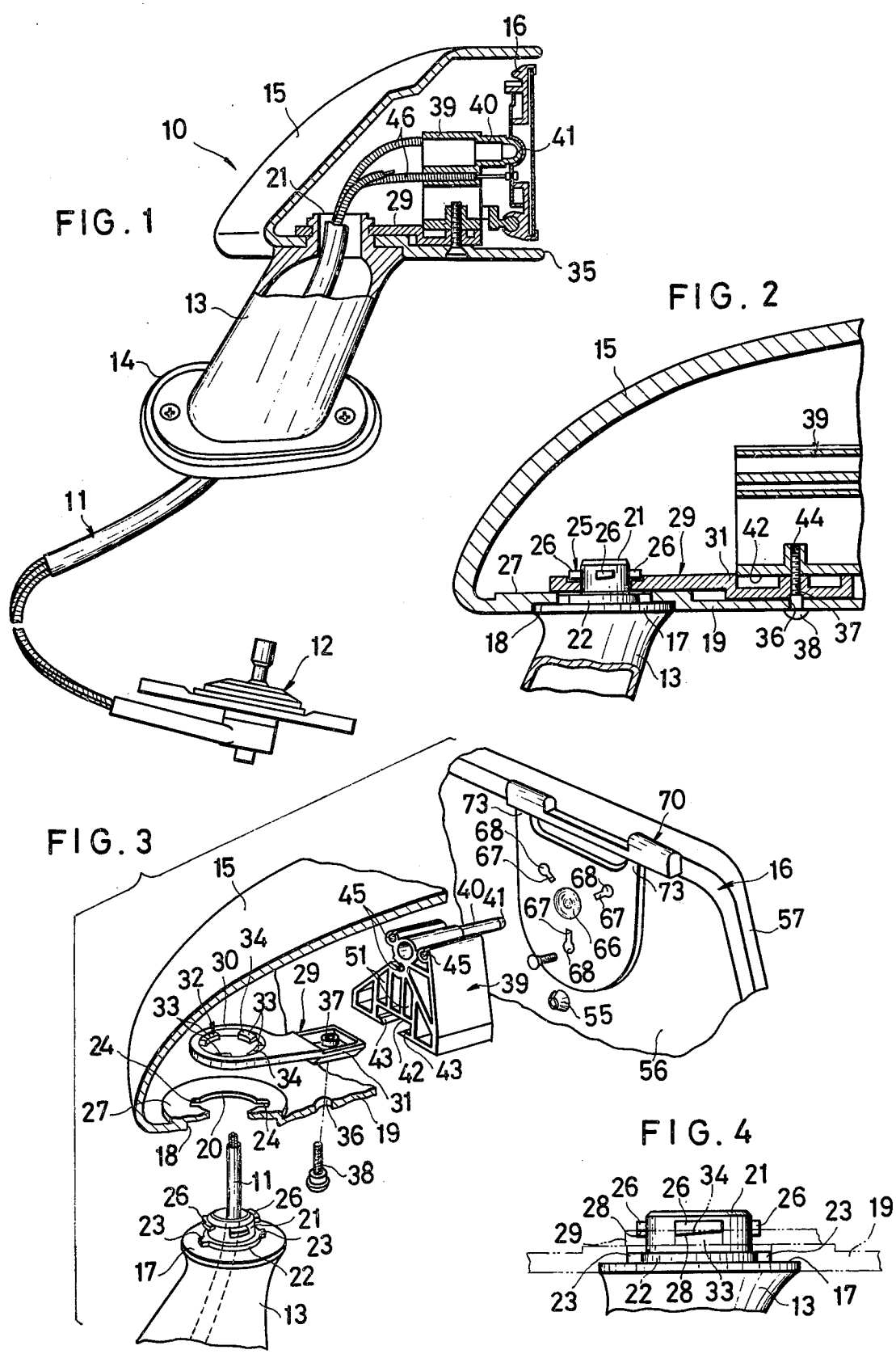

REMOTE CONTROL REAR-VIEW MIRROR

BACKGROUND OF THE INVENTION

1. Field of the Invention

The present invention relates to a remote control rear-view mirror assembly which is angularly adjustable for a desired rear view by a manual actuator located remotely therefrom.

2. Prior Art

Many present day automotive vehicles are equipped with a remotely controlled rear-view mirror mechanism which includes a mirror holder mounted for universal swivel movement in a housing supported by a bracket mounted exteriorly on the vehicle, and a remotely located actuator knob coupled to the mirror holder through a plurality of control wire elements for transmitting universal pivotal motion to the mirror holder. Upon pivotal movement of the actuator knob in a certain direction, the mirror holder is movable in a corresponding direction.

Since the housing is connected to the bracket typically by means of screws or bolts and nuts, a problem arises in preventing the housing from loosening out of the fixed position as a result of vehicle vibrations. One proposal to minimize this difficulty would be to use as many fasteners as possible to give increased mechanical strength to the connection between the housing and the bracket, but in such instance the assembling procedure would become quite complicated and time-consuming.

Furthermore, the automotive vehicles are subjected to a wide range of temperature variations, from −30° C. in winter up to +70° C. in summer, resulting in relative dimensional changes between parts having different coefficients of thermal expansion, such as the mirror holder made of metal or synthetic resin and the mirror made of glass. Under such thermal conditions, the mirror holder can either expand until it allow the mirror held therein to get loosened and displaced relatively to the mirror holder, or shrink until it distorts or breaks the mirror.

The control wire elements have ferrules on one end thereof that are retained in grooves in the mirror holder. However, with some prior arrangements, the ferrules tend to move in the grooves when the control wire elements are tensioned, with the result that the mirror cannot properly be controlled by the actuator. There has been proposed a separate retainer or ball which retains the attached ferrules in position. Use of such separate retainer is disadvantageous because the assembling of the retainer on the mirror holder involves a tedious task.

SUMMARY OF THE INVENTION

According to the invention, a housing of a remote control rear-view mirror assembly mounted on a bracket has an opening in its bottom plate through which a stub shaft extends from the bracket into the housing, the stub shaft having a plurality of cam projections. Fastening means in the housing includes an annular ring disposed around the stub shaft and having a plurality of cam projections, the cam projections on the annular ring being positioned between those on the stub shaft and the housing bottom plate thus clamping the housing bottom plate between the fastening means and the bracket. A cable attachment adapter is mounted on the mirror holder, the adapter having three key-hole shaped radial grooves angularly spaced 120 degrees apart from each other and retaining therein the ferrules on three control wire elements, there being an annular flange on the mirror holder that abuts against the adapter across the The mirror holder has a peripheral rim which is urged against the perpheral edge of a mirror carried by the holder, the rim including a flange disposed around and over the peripheral mirror edge. A plurality of resilient arms integral with the mirror holder have projections which are resiliently urged toward and held against the mirror to bias the peripheral mirror edge against the rim flange.

An object of the present invention is to provide a remote control rear-view mirror assembly having parts so connected fixedly together so as to resist loosening due to vibrations imposed thereon for a long period of time.

It is another object of the present invention to provide a remote control rear-view mirror assembly that can be assembled easily.

It is still another object of the present invention to provide a remote control rear-view mirror assembly having a mirror holder which resiliently supports a mirror against backlash or breakage thereof due to dimensional changes of the holder relative to the mirror.

Many other advantages, features and additional objects of the present invention will become manifest to those versed in the art upon making reference to the detailed description and the accompanying drawings in which a preferred structural embodiment incorporating the principles of the present invention is shown by way of illustrative example.

BRIEF DESCRIPTION OF THE DRAWINGS

FIG. 1 is a side elevational view with parts cut away of a remote control rear-view mirror assembly constructed in accordance with the present invention;

FIG. 2 is a fragmentary vertical cross-sectional view of a housing and a bracket that are coupled together;

FIG. 3 is a fragmentary exploded perspective view of the assembly;

FIG. 4 is an enlarged side elevational view of a portion where the housing and the bracket are interconnected;

DETAILED DESCRIPTION

Figure 5:
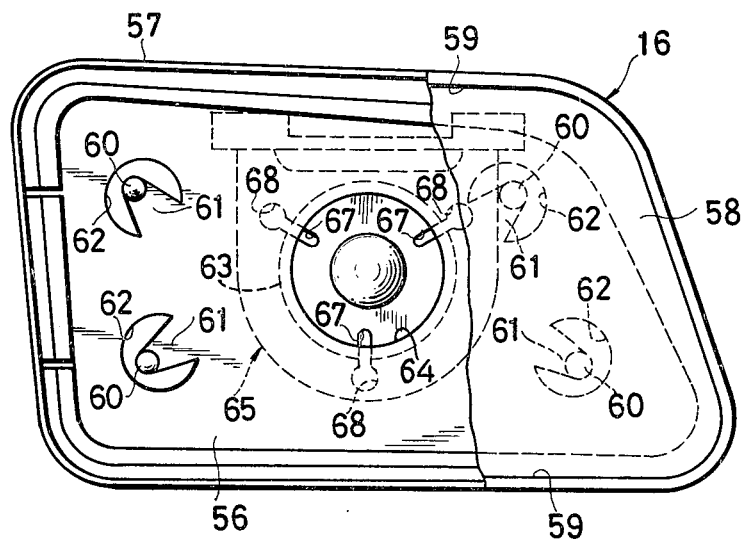
FIG. 5 is a front elevational view of a mirror holder, the mirror being partly broken away.

The principles of the present invention are particularly useful when embodied in a remote control rear-view mirror assembly such as shown in FIG. 1, generally indicated by the numeral 10.

The remote control rear-view mirror assembly 10 is adapted to be fastened to an exterior portion of an automotive vehicle (not shown) and is operated through a control wire means 11 connected to a manually operable actuator 12 which is adapted to be supported inside of the automotive vehicle, as is well known in the art.

The rear-view mirror assembly 10 generally comprises a stay or bracket 13 having on its lower end a flange 14 mountable on the exterior portion of the vehicle, a casing or housing 15 fixedly mounted on an upper end of the bracket 13, and a mirror holder 16 pivotally mounted in the housing 15 for universal swiveling movement about a fixed pivot point. The bracket 13 has a hollow structure through which the control wire means 11 extends for connection to a back of the mirror holder 16.

As best shown in FIGS. 2 through 4, the bracket 13 has a circular flange 17 which is seated or fitted in a circular recess 18 in a bottom plate 19 of the housing 15, the flange 17 lying substantially flush with the bottom plate 19. The housing bottom plate 19 has a circular opening 20 at the recess 18. A hollow stub shaft 21 extends from the bracket flange 17 through the opening 20 with radial clearance, and into the interior of the housing 15, the shaft 21 being substantially coaxial with the flange 17. Around the stub shaft 21, an annular shoulder 22 is disposed on the flange 17, the shoulder 22 having an outer diameter greater than that of the shaft 21, and substantially the same as that of the opening 20, the shoulder 22 being fitted in the opening 20. The shoulder 22 has a pair of diametrically opposite projections 23, 23 received respectively in a pair of notches 24, 24 in the bottom plate 19 that communicate with or extend from the opening 20. Thus the housing 15 is prevented from rotating relative to the bracket 13.

The stub shaft 21 has a first cam means 25 adjacent to its distal end, comprising a plurality of teeth 26, four in the illustrated embodiment, each angularly spaced 90 degrees from adjacent teeth and projecting radially outwardly from the shaft 21. The teeth 26 are located in the housing 15 and are spaced upwardly from an upper surface 27 of the housing bottom plate 19 where the recess 18 is located. As best illustrated in FIG. 4, each of the teeth 26 has a first peripherally sloped cam surface 28 facing downwardly toward the shoulder 22 around the stub shaft 21, all of the cam surfaces 28 on the teeth 26 being included in one direction.

A fastening means on wrench 29 disposed in the housing 15 comprises an annular ring 30 and a lever 31 extending therefrom, the ring 30 being disposed loosely around the shaft 21. The ring 30 has a second cam means 32 comprising a plurality of teeth 33, four in the illustrated embodiment, each angularly spaced 90 degrees from adjacent teeth and projecting radially inwardly from the ring 30. As shown in FIGS. 3 and 4, each of the teeth 33 has a second peripherally sloped cam surface 34 facing upwardly away from the bottom plate 19 of the housing 15, all of the cam surfaces 34 on the teeth 33 being inclined complementarily with respect to the cam surface 28 on the teeth 26.

Each of the teeth 33 on the wrench ring 30 is located between one of the teeth 26 on the stub shaft 21 and the housing bottom plate 19 in angular alignment with the tooth 26, with the cam surfaces 28 and 34 held against each other. The maximum spacing between each tooth 26 on the shaft 21 and the upper surface of the annular shoulder 22 is larger than the maximum thickness of each tooth 33 on the ring 30, and the lower surface of the annular ring 30 is positioned slightly below the upper surface 27 of the bottom plate 19.

When the housing 15 is to be fixed to the bracket 13, the housing recess 18 is fitted over the flange 17, and the shoulder 22 is received in the opening 18 with the projections 23, 23 disposed in the notches 24, 24, respectively. Then, the ring 30 of the fastening wrench 29 is lowered around the shaft 21 which projects into the housing 15, during which time each tooth 33 on the ring 30 passes through a space between adjacent teeth 26 on the shaft 21. The fastening wrench 29 is turned about the shaft 21 to cause each ring tooth 33 to underlie a corresponding one of the shaft teeth 26 and to cause the second cam surfaces 34 to engage the first cam surfaces 28. The wrench 29 is turned, and the ring teeth 33 force the shaft teeth 26 upwardly away from the housing bottom plate 19 due to wedge action, whereupon the bracket flange 17 is held forcibly against the bottom of the recess 18. Accordingly, a portion of the bottom plate 19 which is around the opening 18 is fastened tightly between the fastening wrench 29 and the bracket flange 17. The fastening wrench 29 can easily be turned by hand since it utilizes leverage. Thus it is preferable to direct the lever 31 generally toward a front opening 35 (FIG. 1) of the housing 15 so that the wrench 29 can be manipulated with ease.

As shown in FIGS. 2 and 3, the housing bottom plate 19 has a hole 36 and the wrench lever 31 has a corresponding threaded hole 37 adjacent to its distal end. When the fastening wrench 29 is fully tightened, the threaded hole 37 in the lever 31 is held in registration with the hole 36 in the bottom plate 19. A locking means such as a screw 38 extends through the hole 36 threadedly into the threaded hole 37 to keep the fastening wrench 29 in its tightened position relative to the housing 15.

With this arrangement, the housing 15 is fixedly and stably mounted on the bracket 13 against backlash from sustained vibrations which the automobile undergoes while being driven. Furthermore, the housing 15 can be easily attached to or detached from the bracket 13.

The mirror holder 16 is carried by a supporting block 39 mounted in the housing 15, the block 39 having a rod 40 extending forwardly toward the frontal opening 35 of the housing 15. The rod 40 has on its free end a hemispherical ball member 41 (best shown in FIG. 9) on which the mirror holder 16 is mounted for universal swiveling movement thereabout. The block 39 has a channel 42 in its lower portion, extending parallel to the rod 40, the channel 42 being bounded partly by a pair of oppositely extending retainer walls 43, 43. The channel 42 receives therein a free end portion of the wrench lever 31. The block 39 has a threaded hole 44 (FIG. 2) which, when the lever 31 is inserted in the block channel 42, is in registry with the tapped hole 37 in the lever 31 and with the hole 36 in the housing bottom plate 19. The screw 38 extends threadedly through the holes 37 and 44, thereby fixedly the block 39 to the wrench lever 31 and hence to the housing bottom plate 19.

The block 39 has three wire retainers 45 (FIG. 3) angularly spaced 120 degrees apart from each other around the rod 40, each retainer 45 comprising a slotted bore. The control wire means 11 includes three Bowden wire elements 46 each having a cable core 47 (FIG. 9) enclosed by a protective sheath 48, each protective sheath 48 being retained at one end in one of the retainer bores 45. The cable core 47 is slidable lengthwise in the sheath 48 and has on its one end a ferrule 49 having a central neck 50 which has a reduced diameter.

Figure 9:
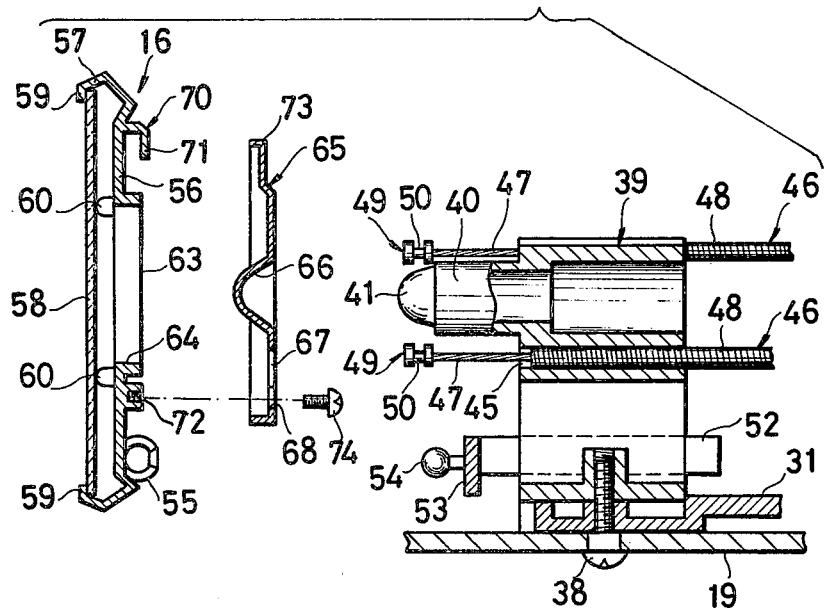
FIG. 9 is an exploded vertical cross-sectional view of the mirror holder and its support block mounted on the housing.

The block 39 has a pair of slots 51, 51 (FIG. 3) in which a pair of bars 52, only one being shown in FIG. 9, are longitudinally slidably disposed, respectively, the bars 52 being interconnected by a connector 53 to which is secured a ball 54 fitted in a socket 55 on the mirror holder 16 (FIGS. 3, 6, 7, and 9). Since the bars 52 can move in the slots 51, 51 only in their longitudinal direction, the mirror holder 16 is prevented from being pivoted in the general plane thereof about the hemispherical ball member 41, thereby limiting the mirror holder 16 to universal swivel motion governed by the three control wire elements 46.

Figure 6:
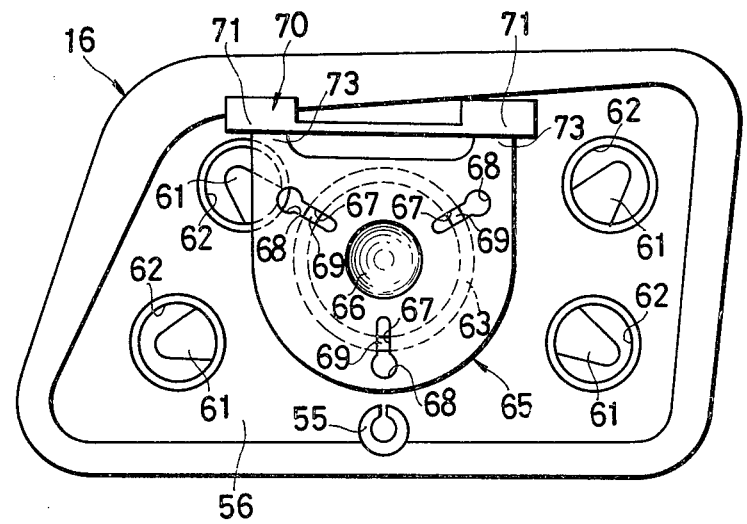
FIG. 6 is a rear elevational view of the mirror holder.
Figure 7:
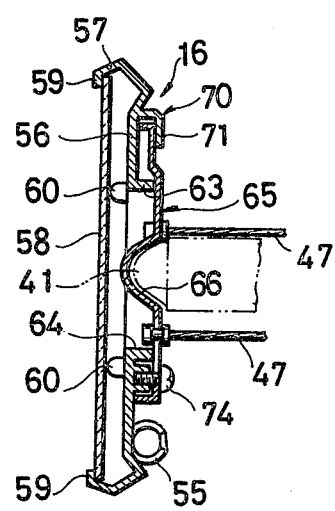
FIG. 7 is a vertical cross-sectional view of the mirror holder.
Figure 8:
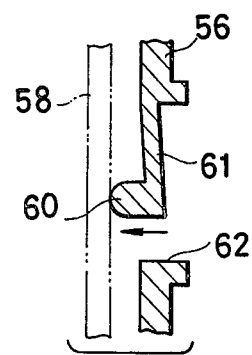
FIG. 8 is a fragmentary enlarged view of a portion of the mirror holder.

As shown in FIGS. 5, 6, and 7, the mirror holder 16 comprises a body 56 and a peripheral rim 57 extending around the body 56, the peripheral rim 57 being resiliently-urged against the peripheral edge of a mirror 58 supported by the mirror holder 16. The peripheral rim 57 includes a flange 59 spaced from the mirror holder body 56 and disposed around and over the peripheral edge of the mirror 58. The mirror 58 is resiliently urged away from the mirror holder body 56 by a plurality of projections 60 extending away from the mirror holder body 56 (FIG. 7), each projection 60 being disposed on a resilient arm 61 integral with the mirror holder body 56. The arms 61 project into apertures 62 in the mirror holder body 56 (FIGS. 5 and 6) and, when the mirror 58 is placed in the holder 16, are pushed away from the mirror 58 by engagement of the projections 60 therewith. The mirror 58 is urged away from the mirror holder body under reactive forces from the arms 61 as illustrated in FIG. 8. Thus the peripheral edge of the mirror 58 is held forcibly against the flange 59 of the peripheral rim 57. The mirror 58 is held in place in the mirror holder 16 against any tendency to displace the mirror 58 relatively to the mirror holder 16 and against relative dimensional changes between the mirror 58 and the mirror holder 16.

The mirror holder 16 has an annular flange 63 bordering a central opening 64 and projecting away from the mirror 58 (FIGS. 7 and 9). A cable attachment adapter 65 is mounted on the back of the mirror holder 16, the adapter 65 having a central open socket or depression 66 disposed in the central opening 64 in the mirror holder 16, in which the hemispherical ball member 41 is seated. The adapter 65 has three grooves 67 (FIGS. 3, 5, and 6) angularly spaced 120 degrees apart from each other around the depression 66, the grooves 67 extending in radial relation to the depression 66. Each of the grooves 66 communicates with a hole 68 which is located radially outwardly of the groove 67. Each ferrule 49 has a maximum diameter that is smaller than that of one of the holes 68, but is greater than the width of one of the grooves 67. The neck 50 of each ferrule 49 rides in one of the grooves 67 for connection of each of the control wire elements 46 with the attachment adapter 65. The annular flange 64 is held in abutting engagement with the attachment adapter 65 (FIG. 7) and has portions 69 each lying across one of the grooves 67, as best illustrated in FIG. 6. The mirror holder 16 has a retainer 70 on its back, the retainer 70 having a pair of flanges 71 spaced from the mirror holder body 56. The mirror holder 16 also has a threaded hole 72 which positionally corresponds to one of the adapter holes 68 which is located remotely from the retainer 70. The attachment adapter 65 has a pair of legs 73,73 (FIG. 6) inserted between the retainer flanges 71,71 and the mirror holder body 56.

For coupling the control wire elements 46 with the mirror holder 16, each of the ferrules 49 is put into one of the holes 68 in the attachment adapter 65 and its neck 50 is slid in and along the groove 67 until the neck 50 is located at an end of the groove 67 that is adjacent to the depression 66. With all the ferrules 49 thus installed, the attachment adapter 65 is mounted on the mirror holder 16 by placing the legs 73,73 under the retainer flanges 72,72 and inserting a screw 74 through the hole 68 in the adapter 65 threadedly into the threaded hole 72 in the mirror holder 16. Since the annular flange 63 is located between each ferrule 49 and a corresponding one of the holes 68, the ferrules 49 are retained in the grooves 68 against displacement toward the holes 68. Accordingly, the attachment adapter 65 enables the wire elements 46 to be connected to the mirror holder 16 in a relatively simple manner, and upon installation the adapter bolds them securely against removal.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A remote control rear-view mirror assembly, comprising:
   (a) a mounting bracket having a housing mount;
   (b) a housing secured to said housing mount;
   (c) a mirror holder;
   (d) separable cable attachment means detachably mounted on said mirror holder and having a plurality of grooves therein disposed at angularly spaced points, and extending radially from a fixed pivot point, said cable attachment means having holes each of which communicates with one of said grooves;
   (e) means mounted in said housing and supporting said cable attachment means for universal pivotal movement about said fixed pivot point;
   (f) an actuator;
   (g) a plurality of control cables each connected at one end to said actuator;
   (h) a plurality of ferrules secured to the other end of said control cables, each ferrule having a portion with a diameter greater than the width of said grooves and said diameter being less than that of said holes, said ferrules being disposed in said grooves; and
   (i) means on said mirror holder retaining said ferrules in said grooves.

2. A remote control rear-view mirror assembly, comprising:
   (a) a mounting bracket having a housing mount including a flange with a shaft extending therefrom, said shaft having first cam means with a first cam surface;
   (b) a housing having a bottom plate disposed on said mount with said shaft and said first cam means extending therethrough, said bottom plate having a recess in which said housing mount flange is seated;
   (c) fastener means including a ring having second cam means with a second cam surface, said ring extending around said shaft and engaging said bottom plate, said second cam means being disposed between said first cam means and said bottom plate with said first and second cam surfaces engaging each other;
   (d) means locking said fastener means to said housing;
   (e) a mirror holder;
   (f) means mounted in said housing and supporting said mirror holder for universal pivotal movement about a fixed pivot point;
   (g) an actuator; and (h) a plurality of control cables connecting said actuator to said mirror holder at a plurality of points angularly spaced around said fixed pivot point.

3. A remote control rear-view mirror assembly, comprising:
   (a) a mounting bracket having a housing mount with a shaft extending therefrom, a shoulder on said housing mount extending around said shaft, said shaft having first cam means with a first cam surface;
   (b) a housing having a bottom plate disposed on said mount and having an opening, said shaft and said first cam means extending through said opening, said shoulder being fixedly fitted in said opening;
   (c) fastener means including a ring having second cam means with a second cam surface, said ring extending around said shaft and engaging said bottom plate, said second cam means being disposed between said first cam means and said bottom plate with said first and second cam surfaces engaging each other;
   (d) means locking said fastener means to said housing;
   (e) a mirror holder;
   (f) means mounted in said housing and supporting said mirror holder for universal pivotal movement about a fixed pivot point;
   (g) an actuator; and
   (h) a plurality of control cables connecting said actuator to said mirror holder at a plurality of points angularly spaced around said fixed pivot point.

4. A remote control rear-view mirror assembly according to claim 3, including a pair of projections on said shoulder, said pair of projections being diametrically oppositely disposed with respect to said shaft, said bottom plate having a pair of notches communicating with said opening and receiving said pair of projections, respectively.

5. A remote control rear-view mirror assembly, comprising:
   (a) a mounting bracket having a housing mount with a shaft extending therefrom, said shaft having first cam means with a first cam surface;
   (b) a housing having a bottom plate disposed on said mount with said shaft and said first cam means extending therethrough;
   (c) fastener means including a ring having second cam means with a second cam surface, said ring extending around said shaft and engaging said bottom plate, said second cam means being disposed between said first cam means and said bottom plate with said first and second cam surfaces engaging each other, said fastener means including a lever extending from said ring;
   (d) locking means extending through said housing bottom plate threadedly into said lever of said fastener means;
   (e) a mirror holder;
   (f) means mounted in said housing and supporting said mirror holder for universal pivotal movement about a fixed pivot point;
   (g) an actuator; and
   (h) a plurality of control cables connecting said actuator to said mirror holder at a plurality of points angularly spaced around said fixed pivot point.

6. A remote control rear-view mirror assembly according to claim 5, said supporting means having a channel in which a portion of said lever is disposed, said locking means extending through said lever portion threadedly into said supporting means.

7. A remote control rear-view mirror assembly, comprising:
   (a) a mounting bracket having a housing mount with a shaft extending therefrom, said shaft having first cam means with a first cam surface;
   (b) a housing having a bottom plate disposed on said mount with said shaft and said first cam means extending therethrough;
   (c) fastener means including a ring having second cam means with a second cam surface, said ring extending around said shaft and engaging said bottom plate, said second cam means being disposed between said first cam means and said bottom plate with said first and second cam surface engaging each other;
   (d) means locking said fastener means to said housing;
   (e) a mirror holder;
   (f) means mounted in said housing and supporting said mirror holder for universal pivotal movement about a fixed pivot point;
   (g) an actuator;
   (h) a plurality of control cables for connecting said actuator to said mirror holder at a plurality of points angularly spaced around said fixed pivot point;
   (i) cable attachment means mounted on said mirror holder and having a plurality of grooves therein that correspond in position to said angularly spaced points, each of said control cables having on one end a ferrule including a portion having a diameter greater than the width of one of said grooves and retained therein, said grooves extending in radial relation to said fixed pivot point, there being holes in said cable attachment means, each said hole communicating with one of said grooves and being greater in diameter than said ferrule; and
   (j) said mirror holder having means preventing said ferrules from being displaced from said grooves toward said holes, said displacement preventing means comprising an annular flange on said mirror holder, said annular flange being held in abutting engagement with said cable attachment means and having portions each lying across one of said grooves and located between the ferrule disposed therein and the hole communicating therewith.

8. A remote control rear-view mirror assembly, comprising:
   (a) a mounting bracket having a housing mount with a shaft extending therefrom, said shaft having first cam means with a first cam surface;
   (b) a housing having a bottom plate disposed on said mount with said shaft and said first cam means extending therethrough;
   (c) fastener means including a ring having second cam means with a second cam surface, said ring extending around said shaft and engaging said bottom plate, said second cam means being disposed between said first cam means and said bottom plate with said first and second cam surfaces engaging each other;
   (d) means locking said fastener means to said housing;
   (e) a mirror holder;
   (f) means mounted in said housing and supporting said mirror holder for universal pivotal movement about a fixed pivot point;
   (g) an actuator;

(h) a plurality of control cables for connecting said actuator to said mirror holder at a plurality of points angularly spaced around said fixed pivot point;

(i) cable attachment means mounted on said mirror holder and having a plurality of grooves therein that correspond in position to said angularly spaced points, each of said control cables having on one end a ferrule including a portion having a diameter greater than the width of one of said grooves and retained therein, said grooves extending in radial relation to said fixed pivot point, there being holes in said cable attachment means, each said hole communicating with oe of said grooves and being greater in diameter than said ferrule; and (j) said mirror holder having means retaining a portion of said cable attachment means by preventing said ferrules from being displaced from said grooves toward said holes, there being a threaded fastener extending through one of said holes threadedly into said mirror holder.

9. A remote control rear-view mirror assembly, comprising:
(a) a mounting bracket having a housing mount;
(b) a housing secured to said housing mount;
(c) a mirror holder;
(d) cable attachment means mounted on said mirror holder and having a plurality of grooves therein disposed at angularly spaced points, and extending radially from a fixed pivot point, said cable attachment means having holes each of which communicates with one of said grooves;
(e) means mounted in said housing and supporting said cable attachment means for universal pivotal movement about said fixed pivot point;
(f) an actuator;
(g) a plurality of control cables each connected at one end to said actuator;
(h) a plurality of ferrules secured to the other end of said control cables, each ferrule having a portion with a diameter greater than the width of said grooves and said diameter being less than that of said holes, said ferrules being disposed in said grooves; and
(i) means on said mirror holder retaining said ferrules in said grooves, said retaining means comprising an annular flange on said mirror holder, said annular flange being held in abutting engagement with said cable attachment means and having portions each lying across one of said grooves and located between the ferrule disposed therein and the hole communicating therewith.

10. A remote control rear-view mirror assembly, comprising:
(a) a mounting bracket having a housing mount;
(b) a housing secured to said housing mount;
(c) a mirror holder;
(d) cable attachment means mounted on said mirror holder and having a plurality of grooves therein disposed at angularly spaced points, and extending radially from a fixed pivot point, said cable attachment means having holes each of which communicates with one of said grooves;
(e) means mounted in said housing and supporting said cable attachment means for universal pivotal movement about said fixed pivot point;
(f) an actuator;
(g) a plurality of control cables each connected at one end to said actuator;
(h) a plurality of ferrules secured to the other end of said control cables, each ferrule having a portion with a diameter greater than the width of said grooves and said diameter being less than that of said holes, said ferrules being disposed in said grooves;
(i) means on said mirror holder retaining said ferrules in said grooves;
(j) means on said mirror holder retaining a porton of said cable attachment means; and
(k) a threaded fastener extending through one of said holes threadedly into said mirror holder.

11. A remote control rear-view mirror assembly, comprising:
(a) a mounting bracket having a housing mount with a shaft extending therefrom, said shaft having first cam means with a first cam surface;
(b) a housing having a bottom plate disposed on said mount with said shaft and said first cam means extending therethrough;
(c) fastener means disposed entirely within said housing and including a ring having a second cam means with a second cam surface, said ring extending around said shaft and engaging said bottom plate, said second cam means being disposed between said first cam means and said bottom plate with said first and second cam surfaces engaging each other;
(d) means locking said fastener means to said housing;
(e) a mirror holder;
(f) means mounted in said housing and detachably supporting said mirror holder for universal pivotal movement about a fixed pivot point, said fastener ring being accessible for movement only when said mirror holder has been detached;
(g) an actuator; and
(h) a plurality of control cables connecting said actuator to said mirror holder at a plurality of points angularly spaced around said fixed pivot point.

12. A remote control rear-view mirror assembly according to claim 11 including bar means longitudinally slidably disposed in a slot in said supporting means, said bar means having a ball on one end thereof, and said mirror holder having a socket in which said ball is fitted.

13. A remote control rear-view mirror assembly according to claim 11, including separate cable attachment means detachably mounted on said mirror holder and having a depression that positionally corresponds to said fixed pivot point, said detachable supporting means having a hemispherical member for relative pivoting seated in said depression, and said plurality of control cables being connected to said cable attachment means.

14. A remote control rear-view mirror assembly according to claim 11, including separate cable attachment means detachably mounted on said mirror holder and having a plurality of grooves therein that correspond in position to said angularly spaced points, each of said control cables having on one end a ferrule including a portion having a diameter greater than the width of one of said grooves and retained therein, said grooves extending in radial relation to said fixed pivot point, there being holes in said cable attachment means each of which communicates with one of said grooves and is greater in diameter than said ferrule, and said mirror holder having means preventing said ferrules from being displaced from said grooves toward said holes.

15. A remote control rear-view mirror assembly, comprising:
   (a) a mounting bracket having a housing mount;
   (b) a housing interfitting with said housing mount;
   (c) fastener means clamping said housing to said housing mount;
   (d) a mirror holder having a socket at an edge thereof;
   (e) means fixedly mounted in said housing and supporting said mirror holder for universal pivotal movement about a central fixed pivot point;
   (f) an actuator;
   (g) a plurality of control cables connecting said actuator to said mirror holder at a plurality of points angularly spaced around said fixed pivot point;
   (h) bar means longitudinally slidably disposed and guided in a slot in said fixed supporting means; and
   (i) a ball on one end of said bar means pivotally fitted into said socket.

* * * * *